3,386,356
PHOTOGRAPHIC CAMERA WITH INDEPENDENTLY ADJUSTABLE CONTROLS FOR DISTANCE AND DIAPHRAGM APERTURE VALUES
Waldemar T. Rentschler, Calmbach (Enz), Germany, assignor to Alfred Gauthier, G.m.b.H., Calmbach (Enz), Germany, a corporation of Germany
Filed July 27, 1964, Ser. No. 385,191
Claims priority, application Germany, July 27, 1963, G 38,327
8 Claims. (Cl. 95—10)

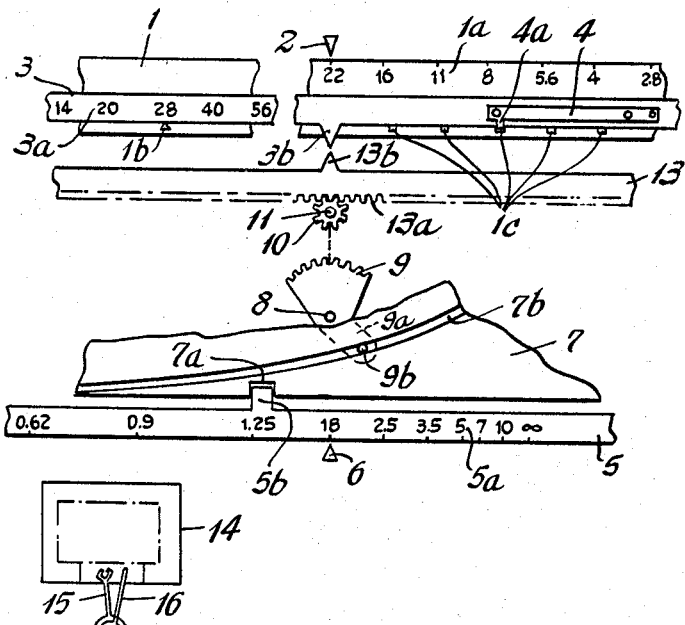
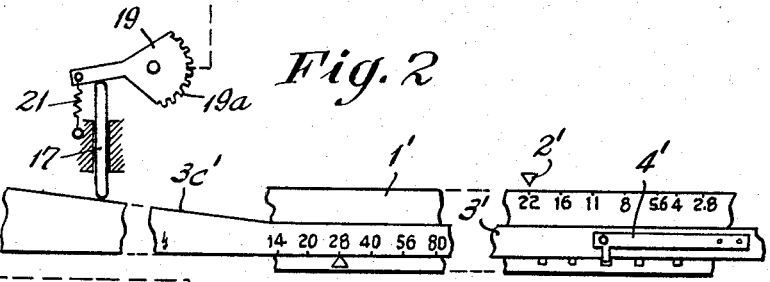
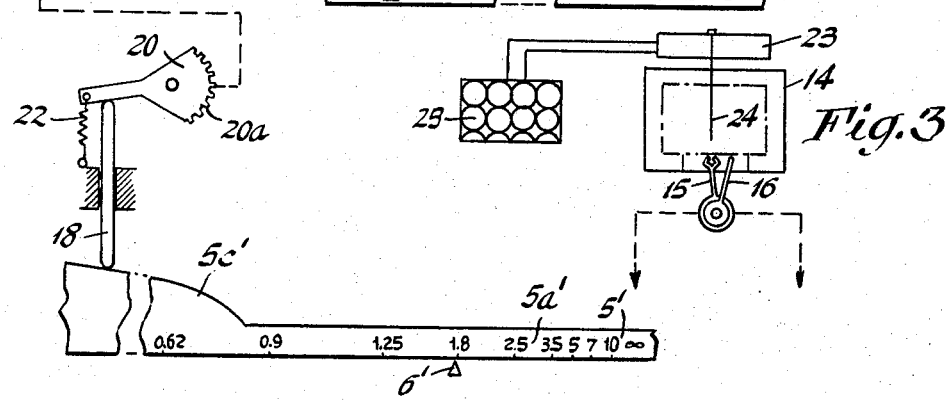
INVENTOR.
Waldemar T. Rentschler
BY
Arthur A. March
ATTORNEY United States Patent Office 3,386,356
Patented June 4, 1968

ABSTRACT OF THE DISCLOSURE

A camera having two pointers to be made to coincide for taking flash photographs, one pointer being controlled by the range setting control and the other by the diaphragm aperture control.

The invention relates to photographic cameras of the type containing independently adjustable controls for distance an diaphragm aperture values, capable of being set at a plurality of positions marked by scale indicia.

In the past, it has been proposed to construct cameras employing mutually adjustable auxiliary distance and guide number scales. One of these scales had been arranged at a setting member oparatively connected to the diaphragm mechanism. In those cameras there may happen some faults in setting, as the photographer may think to have set the proper distance value after having set a certain distance value, so that he omits setting the distance control to that value marked by the auxiliary scale.

The above described disadvantage and drawback of this type of camera is obviated by the present invention, one object of which is to provide a novel and improved photographic camera of the kind outlined above, which includes a special device for setting distance and diaphragm aperture values that are correctly paired, based on the guide number of the type of flashbulb used, when effecting photoflash exposures.

The present invention accomplishes this and solves the problem, without any substantial additional structural expenditure by a novel organization whereby pointers are associated with the diaphragm aperture control as well as with the distance control, one pointer operatively connected to each of the controls. The apparatus is designed so that with correct guide number pairing of distance and diaphragm values in the case of photoflash exposures, the two pointers are positioned opposite each other.

Another object of this invention is to insure that the camera will be simple to adjust when making photoflash exposures, thus avoiding irritations to the photographer but without adding substantially to the cost of the camera.

A further object of the invention is to provide a correlating mechanism whereby linear and nonlinear characteristic scales may be correlated in order to effect correct guide number pairing of distance and diaphragm aperture values.

Still another object of the invention is to provide flexibility in arrangement of the components in cameras, having a focusing control, a diaphragm control and a guide number control in that the guide number control ring may be releasably coupled with either the diaphragm aperture control or the carrier component of the correlating mechanism.

A still further object of the invention is to provide a quick and convenient setting operation of the camera whereby the control rings for distance and diaphragm are operatively connected to aligning pointers. These pointers in turn are adapted to either project directly or to be reflected into the field of vision through the viewfinder.

Yet another object of the invention is to provide flexibility in application of the mechanism in that it may be used in conjunction with cameras having a built-in or attached exposure meter. The pointer associated with the meter may be used to cooperate with the aligning pointer associated with the control ring for diaphragm. All three pointers may then be adapted to either project directly or to be reflected into the viewfinder, thus providing a simple adjustment indicator.

A still further object of the invention is to reduce the structural expenditure required to a minimum by providing that the aligning pointer operatively connected to the diaphragm aperture control ring is designed to be used as an adjustment pointer in the case of daylight exposures.

Details of the invention will become apparent from the specification which follows and from the accompanying drawing, which illustrates the several embodiments and applications of the subject matter of the invention, and in which:

FIG. 1 shows a diagrammatic extended top elevational view of one embodiment of the mechanism designed for adjustment of distance and diaphragm aperture values in making photoflash exposures. The illustration depicts the positioning of the aligning pointers, movably arranged on the objective lens assembly, which are to be made to coincide for correct guide number pairing of the distance and diaphragm aperture values.

FIG. 2 is a diagrammatic representation of another embodiment of the invention wherein the operational means between the aligning pointer and the control rings is modified. Moreover, the pointers are shown arranged in such a manner that they become visible in the viewfinder of the camera.

FIG. 3 shows a schematic view of a further embodiment of the invention wherein the measuring mechanism pointer of another follow pointer system for daylight exposures is depicted arranged with the two pointers of the distance, and diaphragm aperture mechanism in the field of vision of the viewfinder.

Referring first to FIG. 1, a diaphragm aperture control 1, which is usually a ring but is shown here spread out flat, includes a linearly graduated scale 1a which cooperates with a fixed mark 2. Arranged coaxially with the diaphragm aperture control 1, is a guide number control 3 provided for the purpose of taking into consideration the different guide numbers of the types of flashbulbs used. A guide number scale 3a is arranged on the control 3 and cooperates with a mark 1b located on the control 1. The diaphragm aperture control 1 and guide number control 3 are coupled together by a spring 4, which is affixed to the control 3 and which engages notches 1c located on the control 1. The notches 1c are arranged at fixed distances apart, corresponding to respective distances between the scale values 3a of the control 3. A stud 4a projecting from the spring 4 engages the notches 1c as a detent which is releasable for the purpose of setting the controls 1 and 3 individually.

For the purpose of focusing the camera, a distance, or focusing, control 5 in the form of a ring is provided and is arranged coaxially with the controls 1 and 3. The focusing control 5 includes a nonlinear distance scale 5a which cooperates with a fixed mark 6.

A drag ring 7 is provided with a control cam slot 7b for the purpose of correlating the aforementioned linear and nonlinear scales, 1a and 5a, as well as for transmitting any motion of the distance control 5. The drag ring 7 and the control 5 are coupled together by a lug 5b which engages a notch 7a. A pin 9b integrally attached to an arm 9a which radially extends from a toothed segment 9 acts as a cam follower of the cam 7b. The one piece unit comprising segment 9, arm 9a and pin 9b is rotatably positioned on a fixed axis 8, and is meshed, through a series of intermediate gears, not shown for sake of clarity, with a pinion 10. The pinion is mounted on a pin 11 and is affixed to another pinion 12, which in turn meshes with teeth 13a on a carrier 13.

In order that the photographer may efficiently and correctly correlate the distance and diaphragm aperture values with the guide number value, the guide number control 3 is provided with an aligning pointer 3b. A second aligning pointer 13b is correspondingly arranged on the carrier 13. The correlation of distance, diaphragm and guide number values is consummated when the two aligning pointers 13b and 3b are brought into positions directly opposite each other. In photoflash operation then, the photographer, after adjusting the focusing control 5, which sets the pointer 13b, merely has to set the guide number value corresponding to the flashbulb used opposite the mark 1b of the diaphragm aperture control 1. For this purpose the spring blade 4 is released, in order to permit separate rotation of the control 3, and is then snapped back into position in order to lock the two controls 1 and 3 together. The photographer now has only to bring the pointer 3b opposite the pointer 13b in order to adjust the diaphragm aperture.

It is obvious that the guide number control 3 need not be associated with the diaphragm aperture control 1 in the manner illustrated in FIG. 1. The same results may be as efficiently accomplished if the control 3 were capable of being coupled to the carrier 13. In this case, the pointer 3b would have to be arranged on the diaphragm aperture control 1, while the pointer 13b would have to be arranged on the guide number control 3.

The modification of the invention as illustrated in FIG. 2 relates to a camera arrangement corresponding substantially to the arrangement according to FIG. 1, and corresponding parts have been similarly numbered with the addition of an apostrophe. In this embodiment, the diaphragm aperture control 1' can also be firmly connected to the guide number control 3' in different relative positions by means of a spring blade 4'. In addition, the focus control 5' is associated with the two controls 1' and 3', and includes a nonlinear distance scale which cooperates with a fixed mark 6'.

As is apparent from the drawing, the guide number control 3' comprises a linearly ascending cam 3c', while the distance control 5' includes a cam 5c' having an arcuate shape designed to compensate for the nonlinear arrangement of the distance scale 5a'.

In this embodiment of the invention, the aligning pointers 15 and 16 are coaxially and rotatably positioned with respect to each other, and are located in such a manner that they appear in the frame viewfinder 14 of the camera. This arrangement may be such that the pointers either project directly into the field of vision of the viewfinder or are reflected into the field of vision by means of suiable auxiliary devices.

In order to connect the pointers 15 and 16 to the controls 3' and 5', axially guided pins 17 and 18 are provided, which, at one end sense, respectively, the cams 3c' and 5c' and at the other end, act, respectively, on rotatably positioned levers 19 and 20. The levers 19 and 20 are biased, respectively, by springs 21 and 22 in such a manner that one end of each contacts one of the pins 17 and 18. The other ends of the levers 19 and 20 are provided with toothed segments 19a and 20a which are drivingly connected to the respective pointers 15 and 16 by way of additional transmission members, merely indicated by broken lines in the drawing.

In operation then, the photographer merely has to line up the pointers 15 and 16 in the same manner as described earlier with respect to the correlation of pointers 3b and 13b (FIG. 1), in order to correlate the distance and diaphragm aperture values with the guide number value when effecting photoflash exposures.

The modification of the invention as illustrated in FIG 3 relates to a camera arrangement providing a setting aid for the photographer when carrying out both photoflash and daylight exposures. According to this arrangement a pointer 24, nonrotatably connected to a rotating coil 23 of a built-in exposure meter, is visible in the frame viewfinder 14 of the camera. Just as with the pointers 15 and 16, the pointer 24 may either project directly into the field of vision or be reflected in by means known per se. As shown in the drawing, the coil 23 and consequently the pointer 24, move by means of current supplied by a photocell 25 in accordance with light from the scene to be photographed. In this arrangement, the pointer 15, which is operatively connected to the diaphragm aperture control ring, must be placed opposite the pointer 24 in the process of effecting daylight exposures. It thus becomes essential that the guide number control 3' be associated with the distance control 5', so that coincidence may then be established between the pointers 15 and 16 for correlating guide number, distance and diaphragm aperture values in the case of photoflash exposures.

The above described device for semi-automatic adjustment of the camera when carrying out photoflash exposures is suitable for adaptation to both a photographic intra-lens shutter housing and an objective lens housing containing a diaphragm and which may be interchangeable with other objective lenses.

The invention has been described in detail with particular reference to preferred embodiments thereof, but it will be understood that variations and modifications can be effected within the spirit and scope of the invention as described hereinabove and as defined in the following claims.

What is claimed is:

1. A photographic camera comprising an adjustable diaphragm; a diaphragm control ring which can be set at different positions; a first pointer connected to said diaphragm control ring; a focusing control ring; a second pointer connected to said control ring; said pointers being movable into coincidence in order to pair the settings of said diaphragm control and said focusing control in accordance with the guide number equation for making photograph pictures, correlating means connecting said focusing control ring to said second pointer, said correlating means having a control cam connected to said focusing control ring, said control cam having a cam follower engaged therewith, said cam follower being operatively connected to said second pointer, and said cam follower and second pointer being movable by said control cam upon adjustment of said focusing control ring so that said correlating means correlates the linear setting of said diaphragm control to the non linear settings of said focusing control.

2. A photographic camera according to claim 1 comprising, in addition: a viewfinder, said two pointers being visible in the field of vision of said viewfinder.

3. A photographic camera according to claim 2 comprising, in addition: means to reflect an image of said two pointers into the field of vision of said viewfinder.

4. A photographic camera according to claim 2 comprising, in addition: a diaphragm actuating mechanism; and an exposure meter comprising a measuring mechanism pointer, said first pointer being adapted to be influenced by said diaphragm actuating mechanism to coincide with said measuring mechanism pointer, said measuring mechanism pointer being visible in the field of vision of said viewfinder.

5. A photographic camera according to claim 4 in which said pointer connected to said diaphragm control serves as an aligning pointer for daylight exposure.

6. In a photographic camera comprising: an adjustable diaphragm; a diaphragm control means which can be set at different positions; a focusing control; a carrier means; a guide number setting member; coupling structure for connecting said guide number setting member with one of said means in different relative positions; a first pointer integrally attached to said guide number setting member; a second pointer connected to the other one of said controls not connected to said guide number setting member; a viewfinder, said two pointers being visible in the field of vision of said viewfinder; a diaphragm actuating mechanism; and an exposure meter comprising a measuring mechanism pointer, one of said pointers being adapted to be influenced by said diaphragm actuating mechanism to coincide with said measuring mechanism pointer, said measuring mechanism pointer being visible in the field of vision of said viewfinder.

7. A photographic camera according to claim 6 in which said pointer connected to said diaphragm control serves as an aligning pointer for daylight exposures.

8. A photographic camera comprising an adjustable diaphragm; diaphragm control means which can be set at different positions; a focusing control; carrier means operatively connected with said focusing control; a guide number setting member; coupling structure for connecting said guide number setting member with one of said means in different relative positions; a first pointer integrally attached to said guide number setting member; a second pointer connected to the other one of said controls not connected to said guide number setting member; and a correlating mechanism operatively connecting said carrier means with said focusing control said correlating mechanism having a control cam connected to said focusing control, said control cam having a cam follower engaged therewith, and with said cam follower being operatively connected to said carrier means.

References Cited

UNITED STATES PATENTS

| | | | |
|---|---|---|---|
| 2,126,338 | 8/1938 | Mihalyi | 95—10 X |
| 2,974,577 | 3/1961 | Fahlenberg | 95—64 |
| 3,283,681 | 11/1966 | Singer et al. | 95—10 |

NORTON ANSHER, *Primary Examiner.*

JOSEPH F. PETERS, JR., *Assistant Examiner.*